United States Patent [19]

Houben et al.

[11] Patent Number: 4,692,218

[45] Date of Patent: Sep. 8, 1987

[54] PROCESS FOR PRODUCING ETHANOL

[75] Inventors: Heinz Houben, Monchen-Gladbach; Hans U. Petzoldt, Leverkusen; Joachim Stegemann, Hürth-Hermülheim, all of Fed. Rep. of Germany

[73] Assignee: Fried, Krupp GmbH, Fed. Rep. of Germany

[21] Appl. No.: 471,785

[22] Filed: Mar. 3, 1983

[30] Foreign Application Priority Data

Mar. 11, 1982 [DE] Fed. Rep. of Germany ....... 3208743
Feb. 3, 1983 [DE] Fed. Rep. of Germany ....... 3303571

[51] Int. Cl.$^4$ .......................... B01D 3/36; C07C 29/80
[52] U.S. Cl. ........................................ 203/19; 203/22; 203/25; 203/27; 203/68; 203/71; 203/81; 203/DIG. 9; 203/DIG. 13; 435/161
[58] Field of Search .............................. 203/19, 21–27, 203/18, DIG. 13, 71–85, 68, DIG. 9; 426/494; 435/161; 44/56; 202/154

[56] References Cited

U.S. PATENT DOCUMENTS

| | | | |
|---|---|---|---|
| 1,822,454 | 9/1931 | Ricard et al. | 203/19 |
| 3,259,553 | 7/1966 | Halbritter | 203/19 |
| 4,217,178 | 8/1980 | Katzen et al. | 203/19 |
| 4,256,541 | 3/1981 | Muller et al. | 203/DIG. 13 |
| 4,306,942 | 12/1981 | Brush et al. | 203/DIG. 13 |
| 4,309,254 | 1/1982 | Dahlstrom et al. | 203/DIG. 13 |
| 4,340,446 | 7/1982 | Crawford | 203/DIG. 13 |
| 4,349,416 | 9/1982 | Brandt et al. | 203/19 |
| 4,372,822 | 2/1982 | Muller et al. | 203/19 |
| 4,413,150 | 11/1983 | Briggs | 203/DIG. 13 |
| 4,422,903 | 12/1983 | Messick et al. | 203/DIG. 13 |
| 4,511,437 | 4/1985 | Heck et al. | 203/19 |

FOREIGN PATENT DOCUMENTS

| | | | |
|---|---|---|---|
| 50-62914 | 5/1975 | Japan | 203/DIG. 13 |
| 615131 | 7/1978 | U.S.S.R. | 203/DIG. 13 |

Primary Examiner—Wilbur Bascomb
Attorney, Agent, or Firm—Sughrue, Mion, Zinn, Macpeak, and Seas

[57] ABSTRACT

Method and apparatus are provided for simultaneously producing various forms of alcohol, including ethanol, which can likewise be withdrawn from the apparatus simultaneously. To this end, successive columns in the individual processing stages, each of which includes distillation, rectification, purification and dehydration, are connected in parallel for product flow but in series for energy flow and conservation.

17 Claims, 5 Drawing Figures

PROCESS FOR PRODUCING ETHANOL

BACKGROUND OF THE INVENTION

The present invention relates generally to a method and apparatus for producing ethanol from alcoholic mash produced by fermentation and which contains between about 1.5% and about 15% by volume of alcohol. The method comprises the steps of distillation, rectification, purification and dehydration. The method is carried out in individual stages each in a relatively simple, energy-saving and cost reducing manner.

The prior art, as evidenced by German Pat. No. 615,885, relies on processes in which some or all of the vapor discharged from a distillation column is conveyed to a dehydrating column. A portion of the vapor may also be directed from the distillation column to a rectification column. Such prior art processes may, however, only be used for processing slightly alcoholic mash. When it is necessary to process stronger mash, the vapor withdrawn from the distillation column is not sufficient to heat the dehydration column and, as such, it is not effective for such use.

An alternative method for the production of alcohol from fermented mash is described in Austrian Pat. No. 117,027, wherein the mash distillate is converted into either unconcentrated or concentrated alcohol in a distillation column. The alcohol is, thereupon, rectified into purified, concentrated alcohol in a rectification column followed by dehydration in a dehydration column. In order to reduce the amount of steam required to dehydrate the alcohol, the distillation column may be connected to the dehydration column via a conduit which heats the dehydration column using the vapor generated by the distillation column. The system is not particularly effective in conserving energy during distillation and rectification.

It is also known, as evidenced by German Auslegeschrift No. 11 65 549, to effect rectification of an alcohol-water mixture in a number of successive columns connected in series and to convey the vapors which are withdrawn from the head of the first column into the sump of the next column. The additional columns are heated in a similar manner.

Thus, it is already known in the field of distillation to heat a column by the heated vapor conveyed from another column.

Heretofore, while most operating plants were capable of only producing one type of alcohol at a time, it was also known, as described in Austrian Pat. No. 184,540, to simultaneously produce, in a single plant, an absolutized water-free alcohol and a purified aziotropic alcohol from a fermented, alcoholic mash. In accordance with the methods described in this patent, the unconcentrated alcohol issuing from the distillation column is processed into pure alcohol in a group of rectification columns or, as disclosed therein, into rectified alcohol. A portion of such alcohol is then conveyed through a cleaning or purification column and pure alcohol is withdrawn from such column. In accordance with this method, the distillation and rectification columns for preliminary or secondary cleaning or purification are each provided with discrete heating systems. In order to effect heating, the preliminary dehydration column is heated with vapor conveyed from the distillation column. The condensate from the purification column is used to heat the rectification column. Such apparatus can simultaneously produce both types of alcohol. However, it is not possible to alternately produce either of the two types of alcohol.

So long as thermal energy was inexpensive, distillation plants were built in such a way that the requisite heat energy was supplied to individual columns and withdrawn therefrom by an associated condenser. As a result of the recent increased cost for thermal energy, manufacturers of new plants have now reverted to the aforedescribed energy-saving systems for distillation plants with multiple utilization of the vapor. The technology which was applied for such purpose has led, for example, in the case of rectification plants, to at least a 50% reduction in the amount of thermal energy required.

This, however, has resulted in the necessity for constructing distillation columns for superatmospheric or subatmospheric pressures in order to achieve the requisite pressure drop or pressure gradient through the required number of columns which had to be connected with one another. See, for example, German Pat. No. 615,885.

In such cases, it was necessary to first determine whether or not the customary qualities were also achievable in the superatmospheric or subatmospheric range in order to produce ethanol. After testing, it was determined that the quality was the same.

In ethanol producing plants using the above techniques, it was heretofore necessary to use approximately 4.5 to 5 kg of steam per liter of pure alcohol, particularly where the alcoholic mashes to be distilled have an alcohol content of approximately 9% by volume.

OBJECTS AND SUMMARY OF THE INVENTION

An object of the present invention is to provide energy-saving method and apparatus for the production of ethanol having an alcohol concentratiof between about 90% and about 100% by volume by distillation and rectification.

This object is accomplished in that each working stage which is required for distillation and rectification consists of two or more columns, and a product stream flows through one of the distillation columns at a time and through one of the rectification columns. A second (and possibly further) product stream flows through the second (and possibly further) group of distillation and rectification columns. The distillation and rectification columns are connected in series insofar as the energy is concerned with any residual energy being removed downstream of the last rectification columns by a condenser.

By using such a method, it is possible, in a distillation, rectification and dehydration circuit, to minimize the consumption of steam depending upon the pressure of the available steam or vapors because the energy within the system is repeatedly reused.

For example, if the absolute stem pressure is b 5.5 bars, the production of one liter pure alcohol from a purified and dehydrated ethanol requires the consumption of 1,76; 1.54; and 1.40 kg of steam when the alcohol content of the mash is 5; 7.5; and 10% by volume, respectively.

In connection with the above-enumerated consumption of steam, it is assumed that one produces only as much pure alcohol of a desired quality as can be achieved using the quantity of steam energy available for rectification. For example, if one wants to produce two types of alcohol with qualities of 410 and 510, one arrives at the outputs in the following table:

| Vol. | Product output |
|---|---|
| 5% | Quality 410 = 0 — 100% |
|  | 510 = 0 — 80% |
| 7.5% | 410 = 0 — 100% |
|  | 510 = 0 — 70% |
| 10% | 410 = 0 — 100% |
|  | 510 = 0 — 63% |

The figures 410 and 510 denote qualities as determined by the Federal Monopoly Administration of the Federal Republic of Germany (BMV). Spirits having a designation of 510 constitute pure ethanol while 410 denotes a generally high quality spirit.

In the event that one wishes to produce 100% ethanol of 510 quality, the energy consumption required is generally independent of the volumetric concentration of the alcoholic mash. Under the above outlined circumstances, it can amount to approximately 2.1 kg of steam per liter of pure alcohol.

In the event that the available steam has a pressure of 8 bars absolute, the steam consumption drops to 1.85 kg per liter of pure alcohol in view of superior interconnectability of the distillation columns. This also applies for producing 100% ethanol of 510 quality.

In order to conserve energy, alcoholic mash is independently first supplied to several distillation columns. These separate product streams are also guided separately to the interconnected rectification columns, so that with the individual processes a parallel product flow results. The requisite energy is conveyed to the first distillation column and, from there, successively conveyed to the subsequent columns. Consequently, a continuous energy stream is supplied to all columns so that the energy once inputted is reused several times. An input of additional heat into the columns disposed downstream of the first distillation columns is not required. Thus, the process in accordance with the invention guarantees energy savings during the distillation and rectification operations.

Purified alcohol can be obtained with about the same consumption of energy if two or more stripping columns for the mash are connected in series with the distillation and rectification columns. The individual product streams are guided to the stripping columns separately, and the latter are supplied with energy by the corresponding distillation columns.

One or more dehydration columns can also be connected in series with the distillation and rectification columns downstream of the rectification columns. The residual heat is removed downstream of the dehydration columns.

With the apparatus in accordance with the invention, different kinds of alcohol can be obtained in an energy-saving manner and can be removed simultaneously, as well as independently of each other. 100% pure alcohol, 90–97% alcohol or any concentration in between can be obtained. Thus, different types and/or concentrations of alcohol can be withdrawn from the apparatus side by side or simultaneously without deviating from the energy-saving process.

DETAILED DESCRIPTION OF THE PREFERRED EMBODIMENTS

Figure 1:
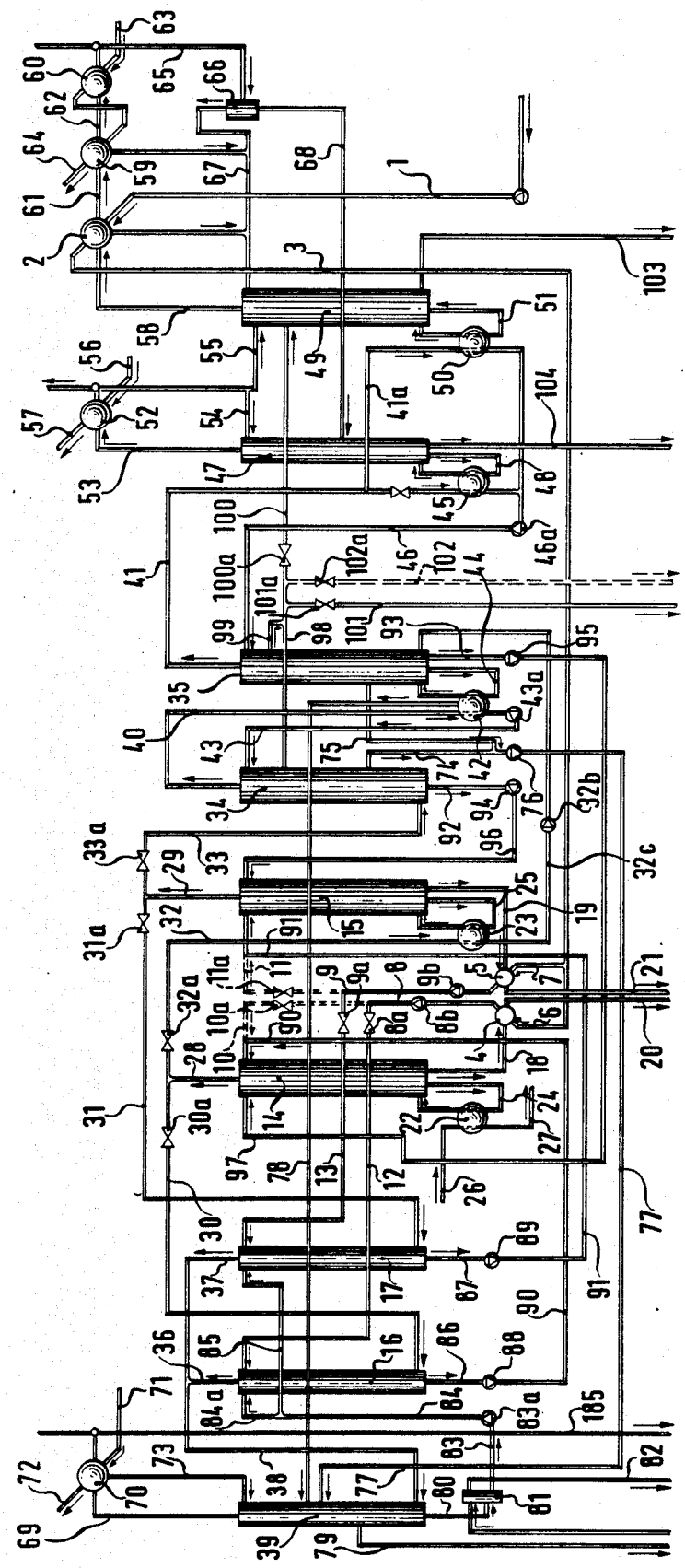
FIG. 1 is a complete arrangement of the apparatus of the subject invention.

The apparatus of the subject invention is illustrated schematically in FIG. 1 which depicts the manner in which the alcohol-containing mash intended for the production of ethanol is admitted into a condenser 2 via a conduit 1 and is preheated therein. The mash is admitted into the first treating stage via mash conduit 3 and then passes to two heat exchangers 4 and 5 by passing through two additional conduits 6 and 7. Depending upon the grade of ethanol to be produced, the mash is pumped via pumps 8b, 9b through conduits 8 to 11 respectively having corresponding valves 8a, 9a, 10a, 11a, and into the heads of two parallel-connected distillation columns 14, 15. Alternatively, the mash is pumped through conduits 12, 13 into two stripping columns 16, 17. Heat exchangers 4 and 5 are heated using distiller's wash or slop which flows from the mash distillation columns 14, 15 through conduits 18 and 19. The slop is withdrawn through conduits 20 and 21.

The mash distillation columns 14 and 15 are heated by heat exchangers 22 and 23. Fresh steam from conduit 26 is condensed in heat exchanger 22. A condensate conduit 27 is provided, and its heat can be utilized in a non-illustrated manner within the overall process at an appropriate location. The heat exchanger 23 receives heat from the distillation column 14 by way of conduit 32 having a valve 32a. A conduit 32c containing a pump 32b leads from the heat exchanger 23 to the sump of a rectifying column 35.

The heat generated by heat exchangers 22 and 23 is admitted into the distillation columns 14 and 15 through circulation conduits 24 and 25. A particularly low specific heat energy consumption is achieved using the subject method and apparatus as a result of the novel interconnection of the distilling columns 14 and 15 which permits the heat from the column 14 to be admitted to distillation column 15 via heat exchanger 23.

The heat from the distillation columns 14 and 15 is withdrawn through head conduits 28 and 29 and is conveyed by way of branch conduits 30 and 31 having respective valves 30a, 31a into the sumps of the stripping columns 16 and 17. Alternatively or additionally, the heat from the head conduit 29 may be conveyed into the sump of a rectification column 34 via conduit 33 having a valve 33a. The heat streams of the stripping columns 16 and 17 contain boiling substances which are withdrawn from the columns 16 and 17 via head conduits 36 and 37, and which are admitted into the sump of a fractionating column 39 through a conduit 38. They are thereupon withdrawn from the process via conduit 79 in the form of tailings or last runnings (higher alcohols). The waste heat from rectifying column 34 is conveyed via conduit 40 into a further heat exchanger 42 from which it is pumped back into the rectifying column 34 through a conduit 43 by a pump 43a. By using a circulating arrangement 44, the heat exchanger 42 transmits its heat to the rectifying column 35. Finally, the heat, at generally a lower pressure level, is utilized in heat exchangers 45 and 50. The heat exchanger 45 receives the heat from the rectifying column 35 by means of a conduit 41, while the heat exchanger 50 receives the heat via a branch conduit 41a of the conduit 41. The heat serves as a heat source for a dehydration column 49 and for a cyclohexane stripping column 47. The medium which conveys the heat to the heat exchangers 45, 50 is pumped back into the head of the rectifying column 35 by a pump 46a through a conduit 46. The heat exchangers 45 and 50 supply their heat via circulation pipes 48 and 51 to the columns 47 and 49. A head conduit 53 from the stripping column 47 leads to a condenser 52 which is connected with the head of the stripping column 47 by a return conduit 54 and with the head of the dehydration column 49 by a branch conduit 55. Furthermore, the condenser 52 is connected with a cooling water conduit 56 and a withdrawing conduit 57. A head conduit 58 from the column 49 leads to the condenser 2 whence a connecting conduit 61 leads to a further condenser 59 and an additional connecting conduit 62 leads to the condenser 60. A cold water conduit 63 extends through the condensers 59 and 60 which are connected to a removing (withdrawing) conduit 64. Removal of heat from the overall process takes place downstream of the dehydration column 49 via the conduit 64 and the condenser 59, and also via the conduit 57 and the condenser 52 at a level above the cyclohexane stripping column 47. Finally, heat is also withdrawn from a condenser 70. Still further, a return conduit 65 connects the condenser 60 to a trap (filter, settling chamber) 66 which is connected with the head of the column 49 by an advancing conduit 67, and with the median zone of the stripping column 47 by an advancing conduit 68. At a level above the fractionating column 39, there is provided the condenser 70 which is connected to the column 39 by a heat conduit 69. A cool water conduit 71 leads into the condenser 70 and a conduit 72 leads from this condenser. Furthermore, a return conduit 73 leads from the condenser 70 into the head of the fractionating column 39. The first runnings (aldehyde) are withdrawn from the condenser 70 via conduit 185.

From the lower third of the rectifying columns 34 and 35, there is withdrawn, through conduits 74 and 75, a medium which is pumped into the median portion of the fractionating column 39 by a pump 76 through a conduit 77. In addition, a conduit 78 is provided leading from the heat exchanger 42 to again admit a medium issuing from the latter into the median level of the column 39. A sump conduit 80 of the fractionating column 39 is connected to a separator or trap 81 where fusel oil is withdrawn via conduit 82. A pump 83a in a conduit 83 pumps a medium through a conduit 84 and into a pair of conduits 84a and 85 which lead to the heads of the stripping columns 16 and 17.

The sump conduits 86 and 87 of the stripping columns 16 and 17 withdraw the pretreated mash which is then pumped into the heads of the distillation columns 14 and 15 by pumps 88 and 89 through conduits 90 and 91. The sump conduits 92 and 93 of the rectification columns 34 and 35 withdraw a medium which is pumped into the heads of the distillation columns 14 and 15 by pumps 94 and 95 via conduits 96 and 97. Withdrawing conduits 98 and 99 are connected to the upper portions of the rectification columns 34 and 35 and lead, via advancing conduit 100 having a valve 100a, to the upper part of the dehydration column 49. Two product conduits 101 and 102 with valves 101a and 102a, respectively, branch from the conduit 100. A sump conduit 104 draws a medium from the cyclohexane stripping column 47. The absolutized ethanol is drawn from the dehydration column 49 via conduit 103.

The circuits illustrated herein are characterized by low energy consumption. Further, independent operation of the parallel-connected distillation columns 14 and 15 and the parallel-connected rectification columns 34 and 35 is possible to produce concentrated, unrefined, raw ethanol (industrial alcohol) having a concentration of approximately 96 to 97%. Such raw ethanol may be withdrawn from the process through the conduit 102.

Figure 2:
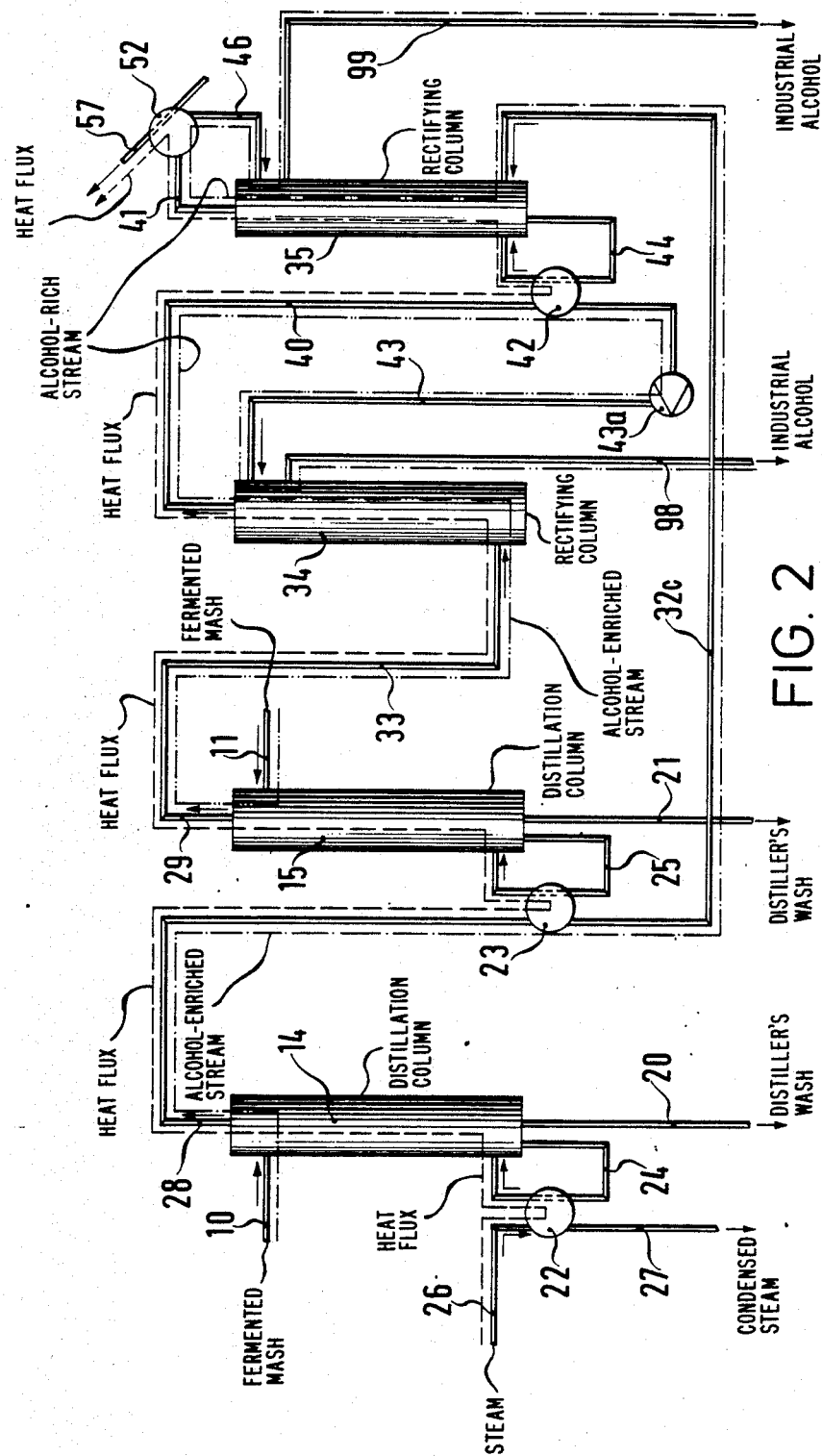
FIG. 2 is a simplified illustration of the distillation and rectification stages thereof.

For a better understanding of the method and apparatus of the subject invention, FIG. 2 illustrates, in a simplified manner, the distillation and rectification stages, consisting of columns 14, 15 and 34, 35, with the continuous energy stream shown by broken lines. The energy is admitted via the conduit 26 and the residual energy is removed from the condenser 52 via the conduit 57. The product is admitted via the conduits 10 and 11 to the columns 14 and 15 in two separate streams, and each product stream is guided through the apparatus separately. The product stream I admitted via 10 is shown with a dash-dot-dash line and the product stream II admittedr via II is shown with a dash-dot-dot-dash line. The product stream II is removed from the apparatus via the conduit 98 of the rectification column 34 and the product stream I is removed from the apparatus via the conduit 99 of the rectification column 35. Both removed products are homogeneous and consists of 90 to 97 Vol. % alcohol with some impurities.

The lines clearly show that the energy flows through the columns 14, 15, 34 and 35 successively, while the product I flows through the columns 14 and 35 and the product II through the columns 15 and 34. The reference numbers in FIG. 2 and also in FIGS. 3 to 5 are identical to the reference numbers in FIG. 1.

In accordance with a second embodiment of the subject method and apparatus, the parallel-connected stripping columns 16 and 17, the fractionating column 39 and the aforementioned four columns 14, 15 and 34, 35 may all be operated so as to permit production of refined alcohol (primaspirit) which has a concentration of between 96 and 97% and may be withdrawn from the process via conduit 101.

Figure 3:
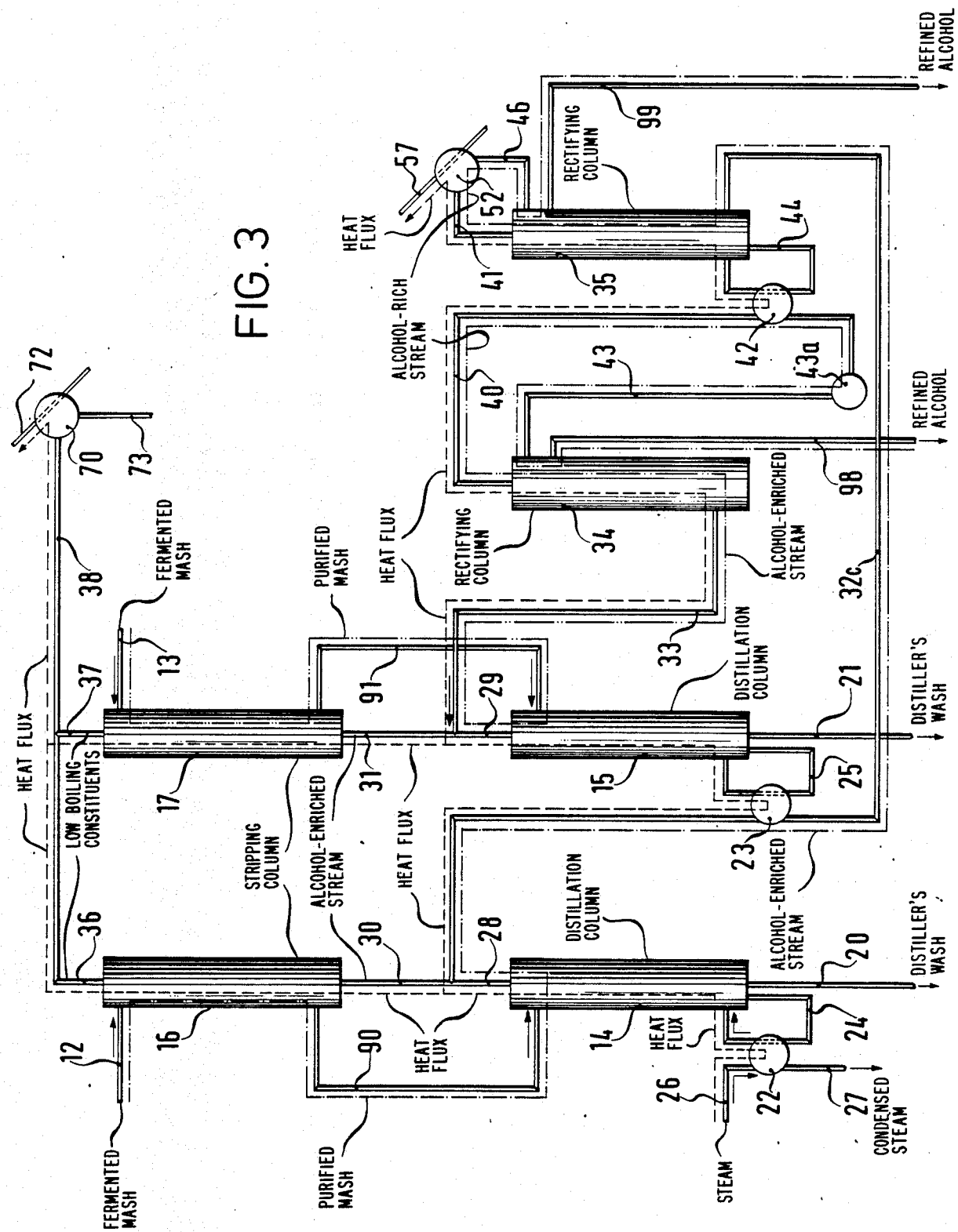
FIG. 3 is a simplified illustration of the distillation and rectification stages with the stripping stage for the mash connected in series.

FIG. 3 illustrates a simplified circuit in which the energy stream (current) is shown by broken line and the two product streams I and II are respectively shown in dash-dot-dash and dash-dot-dot-dash lines. The two product streams I and II are admitted separately to the stripping columns 16 and 17 via conduits 12 and 13 and then separately guided into the columns 14 and 15, as well as the columns 34 and 35. In order to heat the columns 16 and 17, a component current of energy is removed from the columns 14 and 15 and conveyed into the conduits 30 and 31 which branch from the conduits 28 and 29 to the columns 16 and 17. Vapor, including impurities, is led away at the heads of the columns 16 and 17 via conduits 36 and 37.

Figure 4:
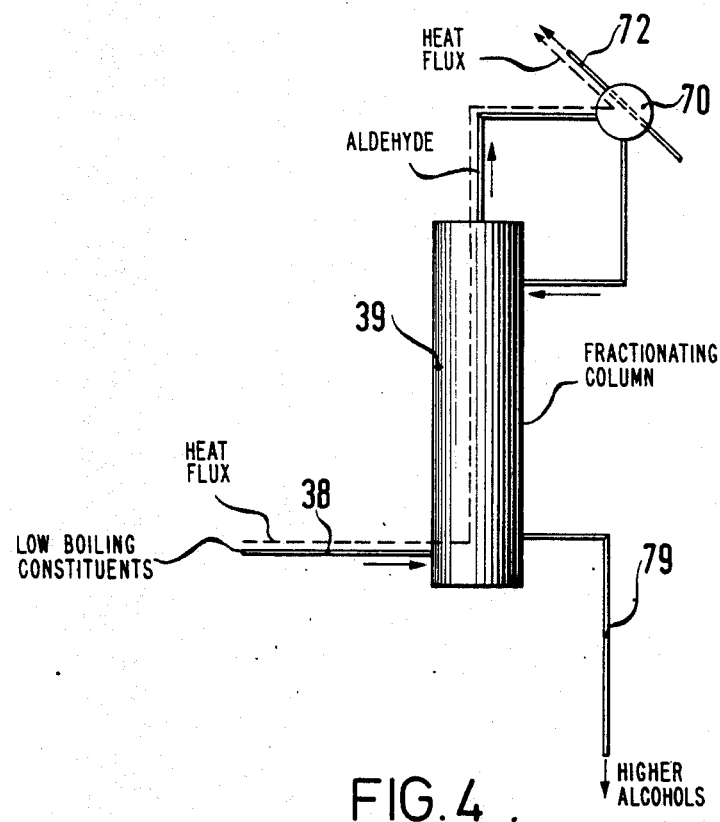
FIG. 4 illustrates the fractionation stage which can be disposed downstream of the stripping stage for the mash.
Figure 5:
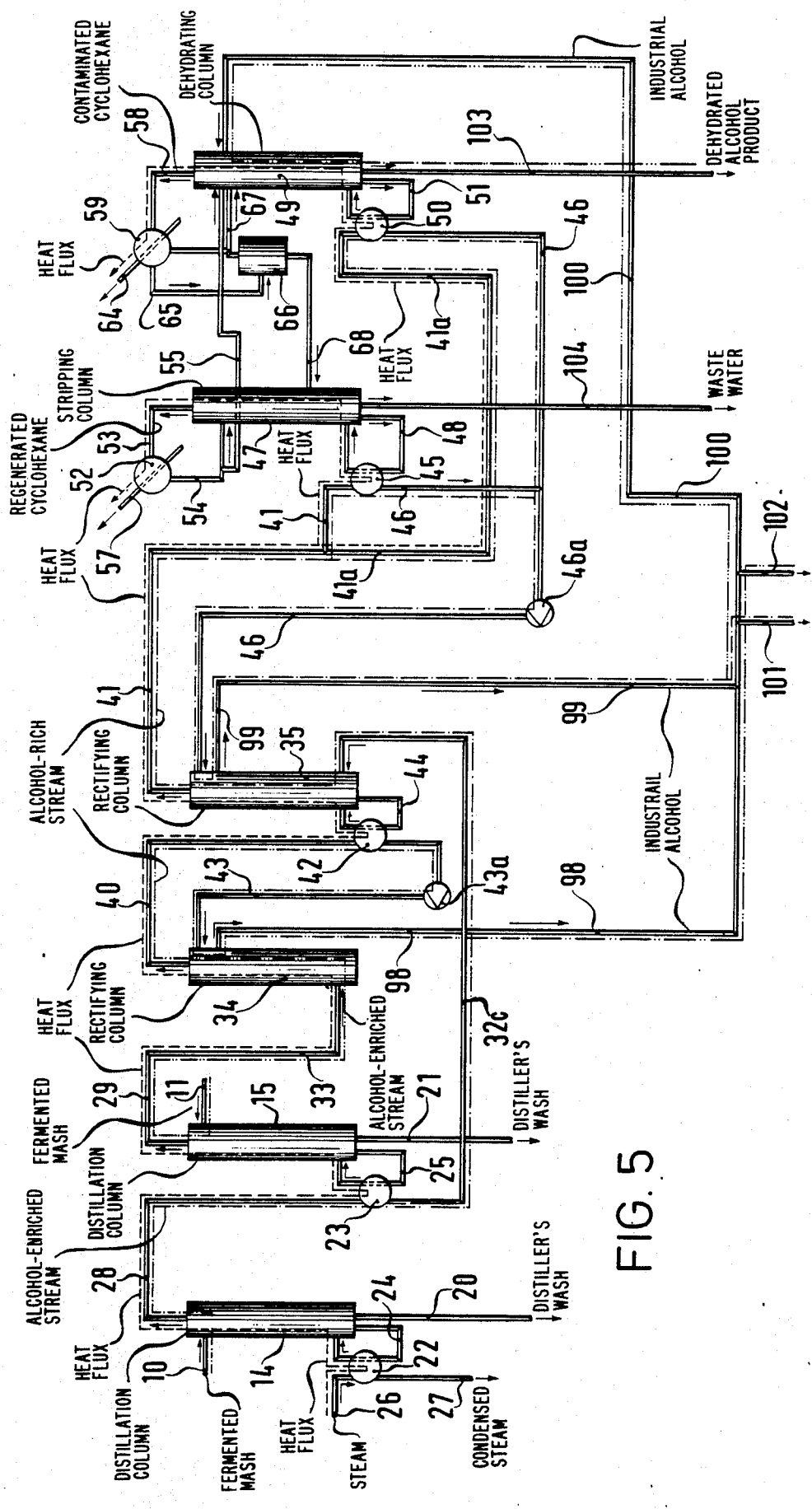
FIG. 5 illustrates in a simplified manner the distillation, rectification and dehydration stages, as well as a stripping stage.

FIG. 4 shows the fractionating column 39 in a simplified circuit.

In another mode of operation, the parallel-connected distillation columns 14 and 15 and the rectification columns 34 and 35 are operated simultaneously with the dehydration column 49 and the cyclohexane stripping column 47 to produce a dehydrated, unpurified ethanol (raw alcohol) which is withdrawn via the conduit 103. FIG. 5 shows the circuit for this mode of operation in a simplified manner but fails to show the product stream coming through the column 47.

In the apparatus according to FIG. 1, all of the illustrated columns, i.e. the distillation columns 14, 15; the rectification columns 34, 35; the cyclohexane stripping column 47; the dehydration column 49; the stripping columns 16, 17; and the fractionating column 39 are operated together. In this complete circuit, a purified water-free ethanol, e.g. BMV quality 510 or DAB 7, is produced and withdrawn from the conduit 103.

Based on the method in accordance with the invention, two different kinds of ethanol can be produced in and withdrawn from the apparatus in accordance with the invention simultaneously.

One kind of ethanol is taken from the conduits 101 and 102, and a second kind from the conduit 103. The decision as to what kinds are produced is made by switching the valves 8a, 9a, 10a, 11a or 100a, 101a and 102a accordingly. Other valves 30a, 31a, 32a and 33a are provided in the conduits 30 to 33.

Thus, for example, unpurified raw alcohol (industrial alcohol) can be withdrawn from the conduit 102 and dehydrated ethanol can be simultaneously withdrawn from the conduit 103. Another possibility would be to withdraw purified, concentrated ethanol (primaspirit) from the conduit 101 and water-free, purified alcohol from the conduit 103.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

Wherefore we claim:

1. A process for the production of ethanol, said process requiring the input of a predetermined quantity of process heat and comprising the steps of:
    (a) admitting a first stream of fermented mash containing about 1.5 to about 15.0 percent by volume of alcohol into a first fluid path having spaced first and second zones;
    (b) distilling, without reflux, said first mash stream in said first zone to recover a first alcohol-enriched stream;
    (c) rectifying, with reflux, at least part of said first alcohol-enriched stream in said second zone to recover a first alcohol-rich product;
    (d) admitting a second stream of fermented mash containing about 1.5 to about 15.0 percent by volume of alcohol into a second fluid path having spaced first and second zones distinct from said first and second zones of said first fluid path;
    (e) distilling, without reflux, said second mash stream in said first zone of said second fluid path to recover a second alcohol-enriched stream;
    (f) rectifying, with reflux, at least part of said second alcohol-enriched stream in said second zone of said second fluid path to recover a second alcohol-rich product;
    (g) admitting said predetermined quantity of process heat into one of said fluid paths at a single location thereof; and
    (h) conveying at least one stream of said heat along a third path, the heat conveying step including transferring heat between said first and second fluid paths in such a manner that said third path includes all of said zones and said one heat stream successively passes through said first zones, and thereafter successively passes through said second zones.

2. The process of claim 1, wherein the heat admitting step is performed at the first zone of said one fluid path.

3. The process of claim 1, comprising the step of removing residual quantities of said one heat stream from said third path downstream of said zones.

4. The process of claim 3, wherein said residual quantities of said one heat stream are contained in a condensible fluid, and the removing step comprises transferring said residual quantities of said one heat stream to another fluid with accompanying condensation of said condensible fluid.

5. The process of claim 1, comprising the steps of stripping impurities from said first mash stream in a third zone of said first fluid path upstream of the respective first and second zones of said first fluid path, removing the stripped first mash stream from said third zone of said fluid path, conveying the stripped first mash stream from said third to said first zone of said first fluid path, stripping impurities from said second mash stream in a third zone of said second fluid path which is located upstream of the respective first and second zones of said second fluid path and is distinct from said third zone of said first fluid path, removing the stripped second mash stream from said third zone of said second fluid path, and transporting second streams of said heat into said third zones.

6. The process of claim 5, wherein the heat transporting step is performed by conveying part of said first alcohol-enriched stream from said first zone to said third zone of said first fluid path together with one of said second heat streams, and conveying part of said second alcohol-enriched stream from said first zone to said third zone of said second fluid path together with another of said second heat streams.

7. The process of claim 5, wherein said second heat streams are transported along a branch section of said third path; and further comprising the step of removing residual quantities of said second heat streams from said branch section subsequent to passage of said second heat streams through said third zones.

8. The process of claim 7, wherein said residual quantities of said second heat streams are contained in condensible fluid streams, and the removing step comprises transferring said residual quantities of said second heat streams to another fluid with accompanying condensation of said condensible fluid streams.

9. The process of claim 5, comprising the steps of withdrawing a first impurities-containing stream from said third zone of said first fluid path, withdrawing a second impurities-containing stream from said third zone of said second fluid path, and fractionating at least one of said impurities-containing streams in at least one fractionating zone.

10. The process of claim 9, comprising the steps of withdrawing a condensible impurity-containing fluid from said fractionating zone, and condensing said impurity-containing fluid.

11. The process of claim 10, wherein said second heat streams are transported along a branch section of said third path; and further comprising the step of removing residual quantities of at least one of said second heat streams from said branch section subsequent to passage of said one second heat stream through the respective third zone, the removing step being performed by conveying said one second heat stream from the respective third zone to said fractionating zone together with said one impurities-containing stream, withdrawing said one second heat stream from said fractionating zone together with said condensible impurity-containing fluid, and transferring said residual quantities of said one second heat stream to another fluid during the step of condensing said condensible impurity-containing fluid.

12. The process of claim 9, wherein each of said impurities-containing streams comprises a vapor.

13. The process of claim 1, comprising the step of dehydrating at least one of said alcohol-rich products in a dehydrating zone.

14. The process of claim 13, wherein the heat conveying step comprises introducing said one heat stream into said dehydrating zone.

15. The process of claim 1, comprising the step of preheating at least one of said mash streams with said heat.

16. The process of claim 1, wherein each of said alcohol-enriched streams comprises a vapor.

17. A process for the production of ethanol, said process requiring the input of a pedetermined quantity of process heat and comprising the steps of:

(a) admitting a first stream of fermented mash into a first fluid path having spaced first and second zones;

(b) distilling, without reflux, said first mash stream in said first zone to recover a first alcohol-enriched stream;

(c) rectifying, with reflux, at least part of said first alcohol-enriched stream in said second zone to recover a first alcohol-rich product;

(d) admitting a second stream of fermented mash into a second fluid path having spaced first and second zones distinct from said first and second zones of said first fluid path;

(e) distilling, without reflux, said second mash stream in said first zone of said second fluid path to recover a second alcohol-enriched stream;

(f) rectifying, with reflux, at least part of said second alcohol-enriched stream in said second zone of said second fluid path to recover a second alcohol-rich product;

(g) admitting said predetermined quantity of process heat into one of said fluid paths at a single location thereof; and (h) conveying at least one stream of said heat along a third path, the heat conveying step including transferring heat between said first and second fluid paths in such a manner that said third path includes all of said zones and said one heat stream successively passes through said first zones, and thereafter successively passes through said second zones.

* * * * *